United States Patent
Cheng et al.

[11] Patent Number: 5,206,757
[45] Date of Patent: Apr. 27, 1993

[54] COLLAPSIBLE FIELD GLASSES

[76] Inventors: Billy Cheng, 6F, No. 31-9, San Min Rd., Hsin Tien, Taipei; Mao-Te Chu, 3F, No. 178, Lane 415, Kuang Fu S. Rd., Taipei, both of Taiwan

[21] Appl. No.: 834,842
[22] Filed: Feb. 13, 1992
[51] Int. Cl.5 .................................. G02B 23/18
[52] U.S. Cl. ............................. 359/408; 359/480
[58] Field of Search ............ 359/408, 480, 481, 474

[56] References Cited

U.S. PATENT DOCUMENTS

| | | | |
|---|---|---|---|
| 706,512 | 8/1902 | Balault | 359/408 |
| 759,170 | 5/1904 | Fournier | 359/408 |
| 822,215 | 5/1906 | Meyrowitz | 359/408 |
| 2,002,782 | 5/1935 | Lester | 359/408 |
| 4,913,538 | 4/1990 | Wakayama et al. | 359/408 |

FOREIGN PATENT DOCUMENTS 40312 12/1903 United Kingdom ............... 359/408

Primary Examiner—Jon W. Henry
Attorney, Agent, or Firm—Jacobson, Price, Holman & Stern

[57] ABSTRACT

A field glasses comprising a flat, rectangular bottom shell, a flat, rectangular cover shell, an object lens assembly pivoted to said bottom shell at one end and supported by a torsional spring into a vertical position, an eyepiece assembly pivoted to said bottom shell at an opposite end and supported by a torsional spring into a vertical position permitting the eyepieces thereof to be respectively in line with the object lenses on said object lens assembly, and two opposite folding side strips foldably connected between said bottom shell and said cover shell at two opposite sides. Pushing said object lens assembly and said eyepiece assembly inwards respectively causes the field glasses to be collapsed into a flat, pocket size structure for carrying in a pocket.

1 Claim, 3 Drawing Sheets

COLLAPSIBLE FIELD GLASSES

BACKGROUND OF THE INVENTION

The present invention relates to field glasses. More particularly, the present invention relates to an economic type, built-up field glasses which can be conveniently assembled or disassembled by the hand without using any tools.

A binocular field glasses generally comprises two tubes connected by a bending bar, which tubes each has an eyepiece and an object lens at two opposite ends for making distant objects appear nearer. This structure of binocular field glasses is expensive to manufacture, and occupies much space when not in use.

SUMMARY OF THE INVENTION

It is an object of the present invention to provide a field glasses which is easy to assemble and inexpensive to manufacture. It is another object of the present invention to provide a field glasses which can be easily assembled or disassembled by the hand without the use of any tools. It is still another object of the present invention to provide a field glasses which can be collapsed into a pocket size when not in use.

According to the present invention, there is provided a field glasses which is generally comprised of a flat, rectangular bottom shell, a flat, rectangular cover shell, an object lens assembly pivoted to said bottom shell at one end and supported by a torsional spring into a vertical position, an eyepiece assembly pivoted to said bottom shell at an opposite end and supported by a torsional spring into a vertical position permitting the eyepieces thereof to be respectively in line with the object lenses on said object lens assembly, and two opposite folding side strips foldably connected between said bottom shell and said cover shell at two opposite sides. Pushing the object lens assembly and said eyepiece assembly inwards respectively causes the field glasses to be collapsed into a flat, pocket size structure for carrying in a pocket.

DETAILED DESCRIPTION OF THE PREFERRED EMBODIMENT

Figure 1:
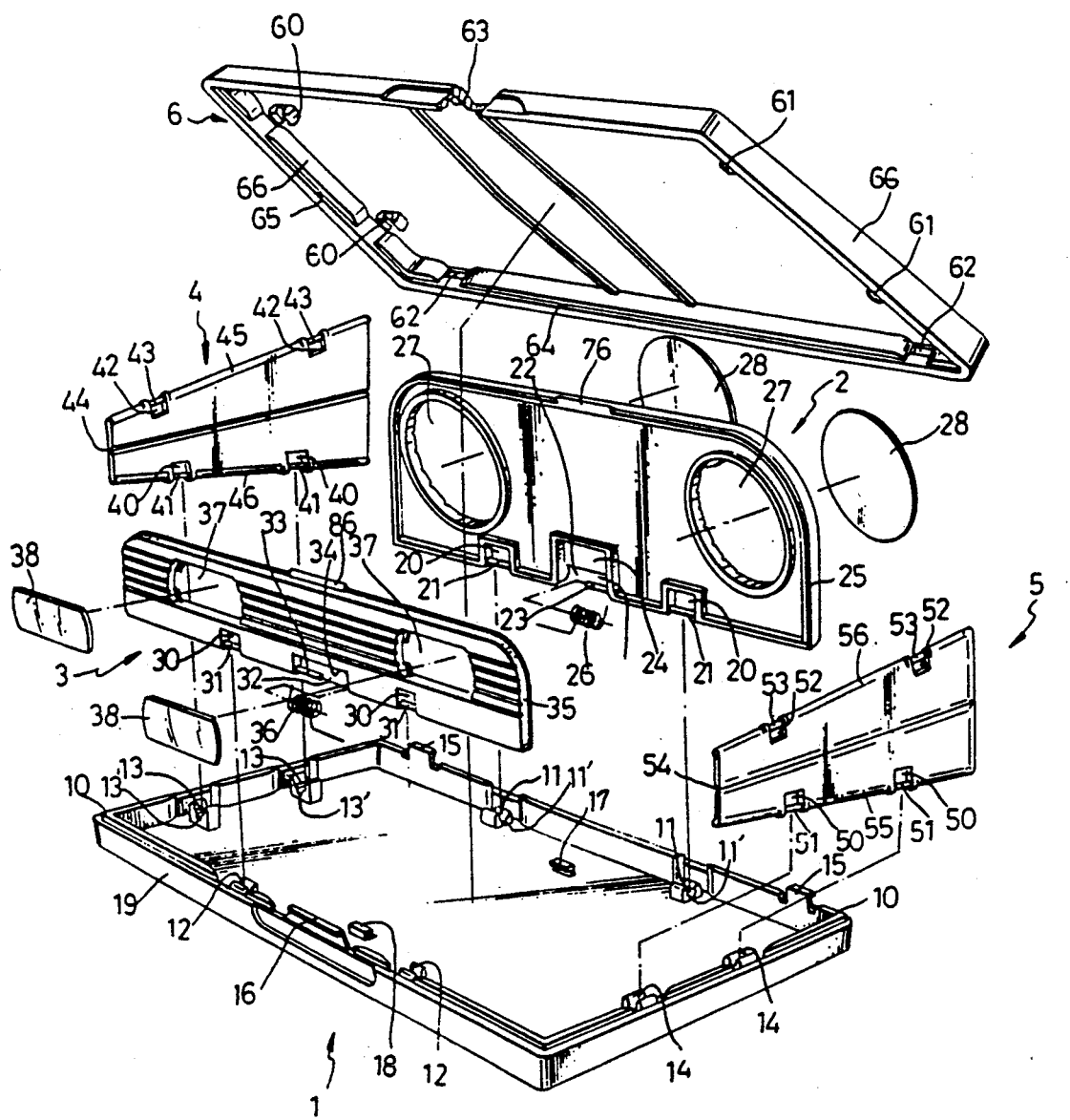
FIG. 1 is an exploded view of the preferred embodiment of the field glasses of the present invention.
Figure 2:
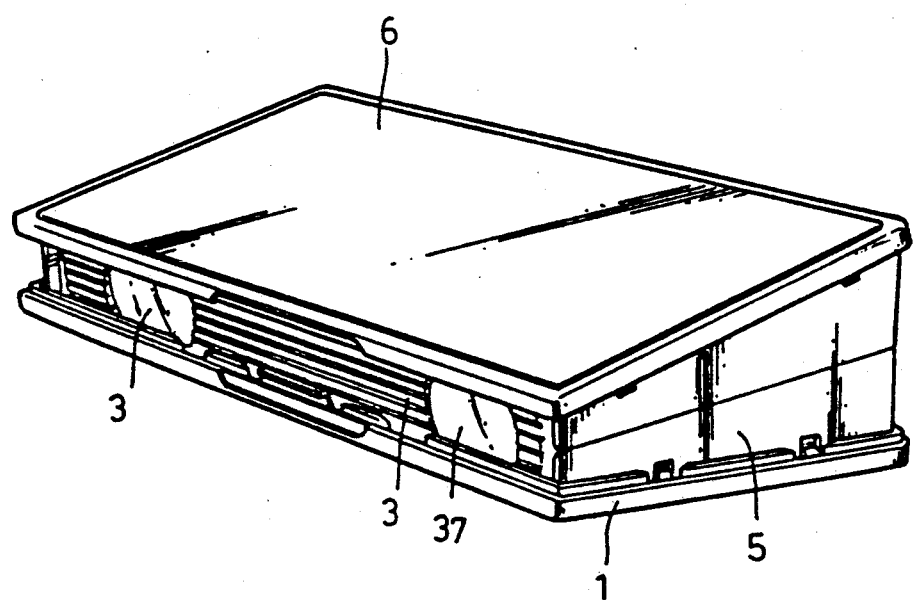
FIG. 2 is an elevation view of the field glasses of FIG. 1.
Figure 3:
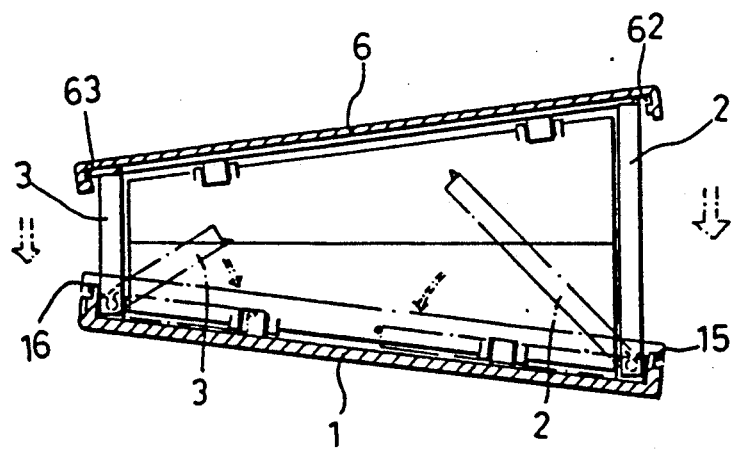
FIG. 3 is a side sectional view of the field glasses of FIG. 1.
Figure 4:
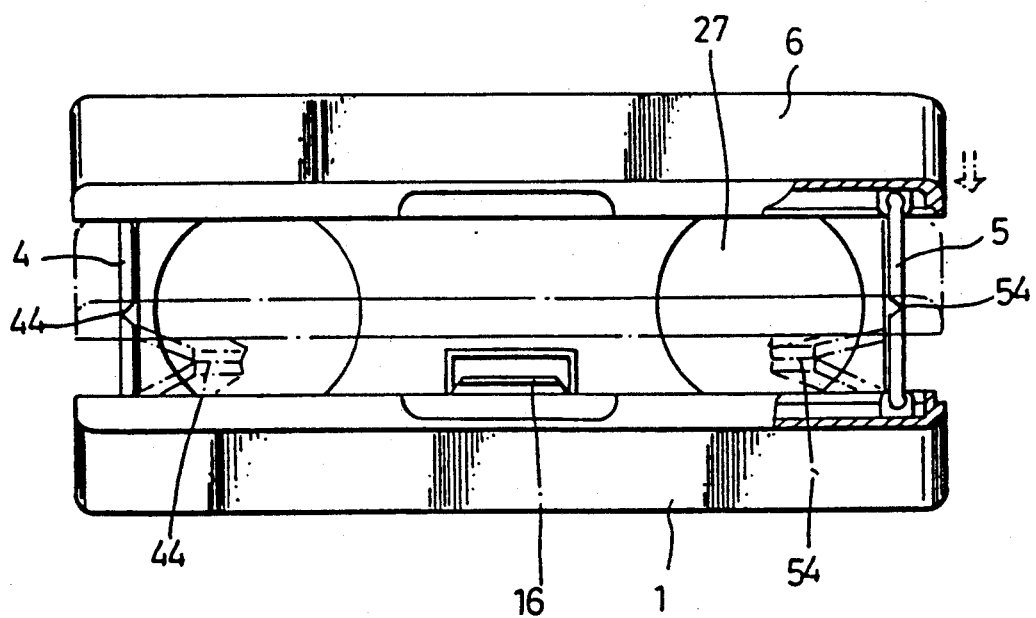
FIG. 4 is a front view of the field glasses of FIG. 1.

Referring to FIG. 1, a field glasses is generally comprised of a bottom shell 1, a cover shell 6, an object lens assembly 2 and an eyepiece assembly 3 respectively secured to said bottom shell 1 at two opposite ends, and two folding side strips 4, 5 connected between said bottom shell 1 and said cover shell 6 at two opposite sides. The field glasses can be set up into a "work form" as shown in FIG. 2, for making distant objects appear nearer. By pushing the object lens assembly 2, the eyepiece assembly 3 and the two folding side strips 4, 5 inwards (see FIGS. 4 and 5), the field glasses can be folded up into a "flat form" for carrying in a pocket.

Referring to FIG. 1 again, the bottom shell 1 is made in a rectangular shape having a vertical wall 19 around the peripheral edge thereof, and four pairs of substantially C-shaped retainer members 11, 12, 13, 14 internally extending from said vertical wall 19 at the four sides thereof. The retainer members 11, 12, 13, 14 each has a retaining hole 11', 12', 13' or 14' at the bottom thereof. The vertical wall 19 of the bottom shell 1 comprises a plurality of hooks 15, 16 on a top flange 10 thereof. There are also provided two opposite hooks 17, 18 on the bottom shell 1 at two opposite locations.

The folding side strips 4, 5 are identical and made in a trapezoidal shape, of which each has a recessed folding line 44 or 54 longitudinally disposed at the middle, two raised lines 45, 46; 55, 56 longitudinally formed along two opposite side edges thereof, and two opposite pairs of holes 40, 42; 50, 52 made on two opposite sides thereof adjacent to said two raised lines 45, 46; 55, 56. Because of the arrangement of the holes 40, 42; 50, 52, two opposite pairs of fastening rods 41, 43; 51, 53 are formed on the two raised lines 45, 46; 55, 56.

The object lens assembly 2 is connected to the bottom shell 1 at a front end thereof while the eyepiece assembly 3 is connected to the bottom shell 1 at a rear end thereof. The object lens assembly 2 and the eyepiece assembly 3 are similar in length. However, the height of the object lens assembly 2 is relatively higher than the eyepiece assembly 3. The object lens assembly 2 and the eyepiece assembly 3 each has a raised peripheral edge 25 or 35, two spaced square holes 20 or 30 adjacent to a bottom edge thereof, a spring mounting hole 22 or 32 between said two spaced square holes 20 or 30, a transverse pin 23 or 33 in said spring mounting hole 22 or 32, a spring 26 or 36 mounted on said transverse pin 23 or 33 in said spring mounting hole 22 or 32, a locating strip 24 or 34 on said spring mounting hole 22 or 32 at two opposite locations, and a flange 76 or 86 on a top edge thereof. Because of the arrangement of the holes 20 or 30, two fastening rods 21 or 31 are formed on the raised peripheral edge 25 or 35. Inserting the fastening rods 21 or 31 in the retaining holes 11' or 12' on the retainer members 11 or 12 permitting one end of the spring 26 or 36 to be retained by the hook 17 or 18, the object lens assembly 2 or the eyepiece assembly 3 is secured to the bottom shell 1 and supported by the spring 26 or 36 in a vertical position. The object lens assembly 2 and the eyepiece assembly 3 each further comprises two lens holes 27 or 37 for holding lenses 28 or 38.

The cover shell 6 is made in a substantially flat structure, having two opposite pairs of C-shaped retainer members 60, 61 corresponding to the C-shaped retainer members 13, 14 on the bottom shell 1 for fastening the fastening rods 42, 52 of the folding side strips 4, 5, two spaced recesses 62 at one end for fastening the two hooks 15 on the bottom shell 1, a notch 63 on the peripheral wall 66 thereof at a location for fastening the hook 16 on the bottom shell 1, and retaining recesses 64, 65 at suitable locations for holding the flanges 76, 86 of the object lens assembly 2 and the eyepiece assembly 3 respectively.

The assembly process of the field glasses is outlined hereinafter. Insert the fastening rods 41, 51 of the folding side strips 4, 5 into the C-shaped retainer members 13, 14 on the bottom shell 1 with the recessed folding lines 44, 54 opposed to each other, permitting the folding side strips 4, 5 to be respectively pivoted to the bottom shell 1. Then, mount the springs 26, 36 on the transverse pins 23, 33, and insert the fastening rods 21, 31 of the object lens assembly 2 and the eyepiece assembly 3 into the C-shaped retainer members 11, 12 permitting the two opposite ends of the springs 26, 36 to be retained by the locating strips 24, 34 and the hooks 17, 18 respectively. Then, insert the fastening rods 43, 53 into the C-shaped retainer members 60, 61 on the cover shell 1 permitting the flanges 76, 86 of the object lens assembly 2 and the eyepiece assembly 3 to be stopped at the retaining recesses 64, 65. By means of the aforesaid procedure, a field glasses can be conveniently set up, as shown in FIG. 2, by the hand without using any tools. By pushing the object lens assembly 2 and the eyepiece assembly 3 inwards respectively, the field glasses can be conveniently collapsed into a flat, pocket size structure for carrying in a pocket. Because of the aforesaid parts can be made from any of a variety of plastic materials, the manufacturing cost of the field glasses is inexpensive.

What is claimed is:

1. A field glasses comprising a flat, rectangular bottom shell, a flat, rectangular cover shell, an object lens assembly pivoted to said bottom shell at one end, said object lens assembly having two object lenses mounted thereon, an eyepiece assembly pivoted to said bottom shell at an opposite end, said eyepiece assembly having two eyepieces mounted thereon at locations corresponding to said object lenses, and two opposite folding side strips connected between said bottom shell and said cover shell at two opposite sides, and characterized in that said two opposite folding side strips each has a plurality of fastening rods longitudinally aligned at two opposite side edges thereof and fastened in holes on a first set of retainer members on said cover shell and said bottom shell respectively; said object lens assembly and said eyepiece assembly each has a plurality of fastening rods longitudinally aligned on a bottom edge thereof and fastened in holes on a second set of retainer members on said bottom shell respectively and supported by a respective spring, and a flange on a top edge thereof releasably stopped at a respective retaining recess on said cover shell, said spring being to support said object lens assembly or said eyepiece assembly into a vertical position.

* * * * *